United States Patent
Mine et al.

(10) Patent No.: US 6,588,947 B2
(45) Date of Patent: Jul. 8, 2003

(54) OPTICAL CONNECTOR

(75) Inventors: Keiji Mine, Osaka (JP); Hiroshi Nakagawa, Kyoto (JP); Yoshiaki Ohbayashi, Nara (JP)

(73) Assignee: Hosiden Corporation, Osaka (JP)

(*) Notice: Subject to any disclaimer, the term of this patent is extended or adjusted under 35 U.S.C. 154(b) by 0 days.

(21) Appl. No.: 10/177,431

(22) Filed: Jun. 20, 2002

(65) Prior Publication Data

US 2002/0197022 A1 Dec. 26, 2002

(30) Foreign Application Priority Data

Jun. 21, 2001 (JP) .................................... 2001-188028

(51) Int. Cl.$^7$ ............................ G02B 6/36; H01R 33/945
(52) U.S. Cl. .............................. 385/92; 385/88; 439/577
(58) Field of Search ............................ 385/88, 89, 90, 385/91, 92, 93, 94; 439/577

(56) References Cited

U.S. PATENT DOCUMENTS

| | | | | |
|---|---|---|---|---|
| 4,547,039 A | * | 10/1985 | Caron et al. ................... | 385/88 |
| 5,596,665 A | * | 1/1997 | Kurashima et al. ........... | 385/92 |
| 6,213,651 B1 | * | 4/2001 | Jiang et al. ................... | 385/92 |
| 6,478,622 B1 | * | 11/2002 | Hwang ........................ | 439/607 |

* cited by examiner

Primary Examiner—David V. Bruce
Assistant Examiner—Michael H Caley
(74) Attorney, Agent, or Firm—David N. Lathrop, Esq.; Gallagher & Lathrop

(57) ABSTRACT

There is provided an optical connector adapted to be used as an optical input terminal or optical output terminal. A plug guide hole passing through a generally square-shaped insulation body is formed. An element folder for accommodating an optical element is made of a sheet metal. The element holder comprises a top plate, opposed side plates and a rear plate covering the top surface, the opposed side surfaces and the rear surface of the optical element mounted in the element holder, and a size between the inner surfaces of the opposed side plates is set to a value substantially equal to the maximum value of the corresponding external size of the optical element. In addition, tongues for resiliently sandwiching and holding the optical element are formed in the opposed side plates of the element holder, respectively, and there is provided on the rear plate of the element holder biasing force applying means for applying to the optical element a resilient biasing force that acts, when the element holder is attached to the rear end of the insulation body, to forcedly push the front surface of the optical element mounted in the element holder against the rear end surface of the insulation body.

19 Claims, 5 Drawing Sheets

FIG. 4
FIG. 5A
FIG. 5B
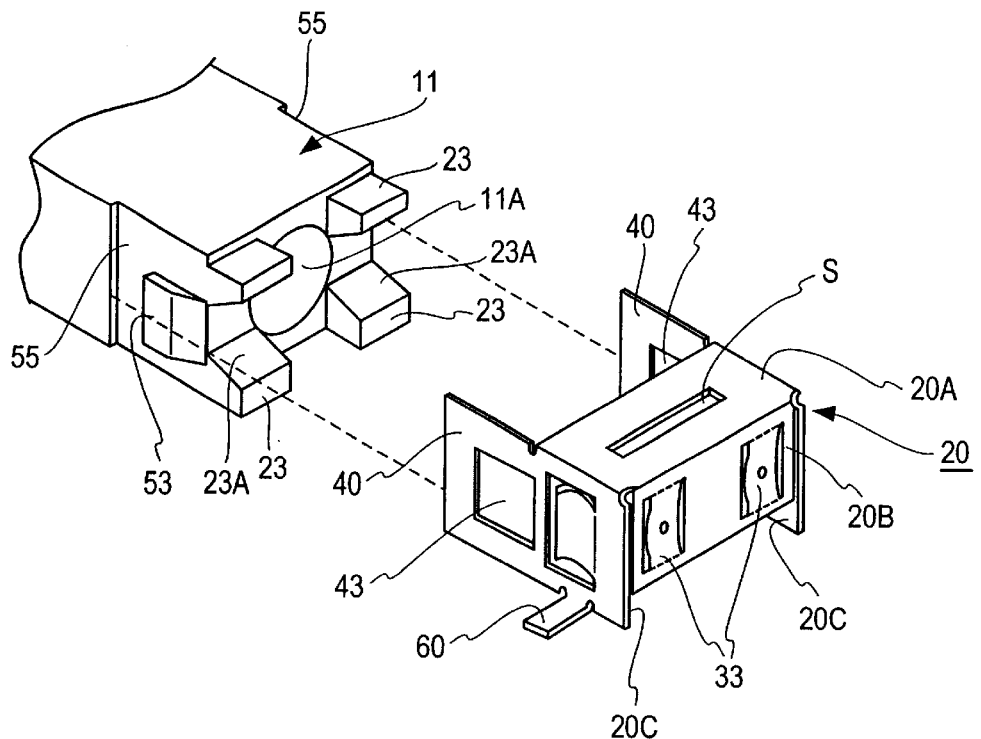
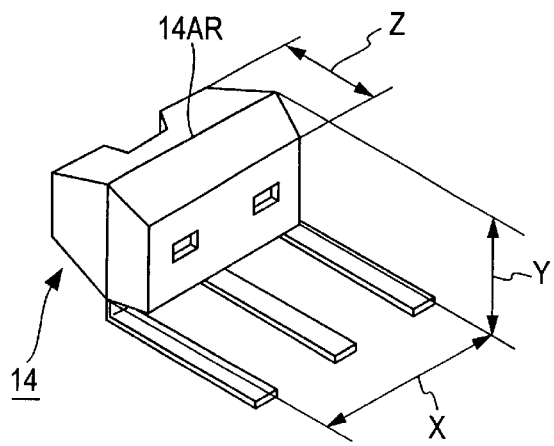
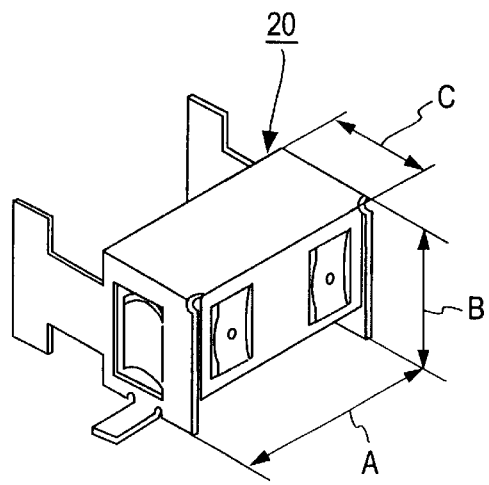

OPTICAL CONNECTOR

BACKGROUND OF THE INVENTION

1. Field of the Invention

The present invention relates to an optical connector adapted to be used as an optical signal input terminal for receiving an optical signal or an optical signal output terminal for outputting an optical signal, and more particularly, to a miniaturized optical connector adapted to be suitably used in any one of many kinds of audio visual apparatuses, personal computers, mobile communication apparatuses, etc., by mounting the optical connector thereto as an optical signal input terminal or an optical signal output terminal.

2. Description of the Related Art

Miniaturized audio visual apparatuses such as a DVD (Digital Versatile Disk) player/recorder, MD (Mini-Disk) player/recorder, CD (Compact Disk) player/recorder, etc., portable audio apparatuses such as an MD portable player/recorder, CD portable player/recorder, memory type audio apparatus (audio apparatus using a memory card), etc., personal computers, mobile communication apparatuses such as a mobile phone, pocket or portable telephone, etc., or the like have been miniaturized more and more in their external configurations or shapes and dimensions or sizes, and accordingly, an input terminal and/or output terminal built in or mounted to these electronic apparatuses have been also miniaturized. Particularly, in recent years, with the advance of optical technology, there have been appeared many kinds of electronic apparatuses and appliances, each having an optical connector mounted thereto as an optical signal input terminal for receiving an optical or light digital signal or an optical signal output terminal for outputting an optical or light digital signal.

An optical connector mounted to any one of various electronic apparatuses and appliances has a light receiving element or light emitting element housed in the connector body thereof, and for instance, one of two optical plugs mounted to an optical cable (for example, optical fiber) at opposed ends thereof respectively, that transmits an optical or light digital signal is directly plugged in the optical connector, so that an optical digital signal is transmitted from the optical cable to the optical connector or from the optical connector to the optical cable.

In Japan, there have been generally used as optical connectors for many kinds of audio visual apparatuses an optical plug having its plug portion of 3.5 mm in outside diameter and an optical receptacle or jack configured such that an optical plug of this size can be plugged therein, and an optical plug having its plug portion of 2.5 mm in outside diameter and an optical receptacle or jack configured such that an optical plug of this size can be plugged therein. However, as stated above, with the miniaturization of various kinds of electronic apparatuses and appliances, there have been proposed optical plugs each having its plug portion of 2 mm or smaller than 2 mm in outside diameter, and the necessity of providing optical receptacles or jacks each being configured such that corresponding one of such optical plugs can be plugged therein is increased.

The assignee of the present application has been proposed an ultra-miniaturized optical receptacle or jack (hereinafter, referred to as optical connector) configured such that an optical plug having its plug portion of 2.5 mm in outside diameter can be plugged therein. At first, such ultra-miniaturized optical connector proposed by the assignee of the present application will be described in detail with reference to FIGS. 6 to 9.

The optical connector comprises a connector body 11 of generally rectangular shape in section and made of an insulation material, and a sleeve 12 formed integrally with the connector body 11 at the front end thereof and projecting forward from the connector body 11. An optical element accommodation section 15 is formed in the connector body 11 at the rear end portion thereof. As is clear from FIG. 7, a plug-in hole 13 configured such that an optical plug having its plug portion of 2.5 mm in outside diameter can be plugged therein is formed through the sleeve 12 and is in communication with a plug guide hole 11A in substantially coaxial relation therebetween, the plug guide hole 11A being formed through the connector body 11 in the longitudinal direction thereof and extending from the front end surface of the body 11 to the optical element accommodation section 15.

The optical element 14 is housed in the optical element accommodation section 15. The optical element 14 is arranged such that in case the optical connector is an optical signal input terminal, the light receiving surface of the optical element 14 is faced to the opening at the rear end of the plug guide hole 11A and in case the optical connector is an optical signal output terminal, the light emitting surface of the optical element 14 is faced to the opening at the rear end of the plug guide hole 11A. In such cases, as shown in FIG. 8, the optical element 14 is arranged such that the optical axis P thereof and the axis of the plug guide hole 11A align or accord with each other. As a result, an optical plug plugged in the plug-in hole 13 and the optical plane of the optical element 14 are optically coupled with each other with a low optical loss, and hence it is possible to transmit an optical digital signal with high efficiency from an optical cable that has been connected to the optical plug to the optical element 14 or from the optical element 14 to the optical cable.

Further, in the illustrated example, the optical element 14 is an element of the type that four terminals 16 thereof are led out backward in parallel with one another from the bottom of the package of the optical element 14. Accordingly, the optical element accommodation section 15 has its bottom opened as shown in FIG. 9, and in the top wall of the optical element accommodation section 15 is formed a slit-like opening that is elongate in its width direction as shown in FIG. 6, the slit-like opening serving to position the top of the package of the optical element 14. As a result, the optical element 14 is inserted into the optical element accommodation section 15 from the bottom side of the connector body 11, and is mounted in place therein by fitting the top of the package in the slit-like opening and positioning the package in place.

Meanwhile, a pair of ground terminals 17 are mounted to the connector body 11 in such manner that they project outwardly respectively from the opposed side surfaces of the connector body 11 at the forward locations thereof to the optical element accommodation section 15. In addition, as shown in FIGS. 7 and 9, the pair of ground terminals 17 have resilient plug holding pieces 19 integrally formed therewith, respectively, and these plug holding pieces 19 are inserted into recesses 18 respectively that are formed at opposite sides of the plug guide hole 11A of the connector body 11 in such manner that they are opposed to each other. These recesses 18 are in communication with the plug guide hole 11A, and when the pair of plug holding pieces 19 are inserted into the corresponding recesses 18 respectively, as shown in FIG. 7, bent portions of the pair of plug holding pieces 19 formed in the vicinity of the forward ends thereof protrude in the plug guide hole 11A in such manner that the bent portions are diametrically opposed to each other, and therefore, the plug guide hole 11A becomes narrower at that portion. Accordingly, when an optical plug having its plug portion of 2.5 mm in outside diameter is inserted into the plug-in hole 13, the tip portion of the optical plug advances between the bent portions of the pair of plug holding pieces 19 so that the bent portions are broadened outwardly. The instance that the maximum diameter portion of the tip portion pass beyond the bent portions, the end surface of the larger diameter portion of the optical plug abuts against the front end surface of the sleeve 12, and hence the optical plug stops advancing. Consequently, a portion immediately after the maximum diameter portion of the tip portion is pressed by and sandwiched or nipped between the bent portions by the resilient forces thereof. Thus, the optical plug is held in the state that it faces exactly the optical plane of the optical element 14.

The optical connector shown in FIGS. 6 to 9 is an optical connector configured such that the length (the depth) L1 extending from the front end of the plug-in hole 13 (the front end surface of the sleeve 12) to the rear end surface of the connector body 11 is set to about 10 mm and the width L2 of the connector body 11 is set to about 7 mm (see FIG. 6), and corresponding to, as stated above, an optical plug having its plug portion of 2.5 mm in outside diameter.

As discussed above, the optical connector proposed by the assignee of the present application has the optical element 14 accommodated in the connector body 11 made of an insulation resin, and the periphery of the optical element 14 is surrounded by the walls of insulation resin constituting the connector body 11. In order to strengthen or reinforce the resin wall to some extent, it is necessary to make the thickness of the resin wall comparatively thicker. For this reason, there is needed a space on the periphery of the optical element 14, the space corresponding to the insulation resin wall of the connector body 11. Therefore, the area in cross-section of the connector body 11 (the area in section thereof in the direction orthogonal to the plug-in hole 13) is larger than that of the optical element 14 by the thickness of the resin wall.

FIG. 10 shows the relation between the areas in cross-section of the connector body 11 and the optical element 14 stated above. As described above, the optical element 14 is housed in the optical element accommodation section 15 formed in the backward end portion of the connector body 11. For this reason, the thickness T of the insulation resin wall of the connector body 11 on the top surface, opposed side surfaces and rear surface of the optical element 14 is added to dimensions of the height, width and depth of the optical element 14, and hence there is a disadvantage that the external shape and size or dimension of the connector body 11 are increased by the thickness T of the insulation resin wall. As shown in FIG. 10, assuming that the dimension in the width direction of the optical element 14 is W and the height of the optical element 14 is H, the dimension A in the width direction of and the height B of the connector body 11 are expressed by the following equations.

$$A \geq W + 2T$$

$$B \geq H + T$$

As to the height B of the connector body 11, it is possible that the height B is reduced to a size substantially equal to the height H of the optical element 14 by forming, in the top wall of the optical element accommodation section 15, a slit-like opening that is elongate in the width direction thereof and serves to position the top of the package of the optical element 14, as described above with reference to FIG. 6. However, it is impossible to reduce the thickness of the insulation resin wall of the connector body 11 existing on the opposed side surfaces and the rear surface of the optical element 14. Thus, it is difficult to further miniaturize the optical connector.

In case of using a resin as the insulation wall of the connector body 11, unless the thickness T of the insulation resin wall of the connector body 11 is set to 1 mm to 1.5 mm, the insulation resin wall cannot have an appropriate strength. Accordingly, in case the size A of the connector body 11 in the width direction thereof is set to 7 mm, the thickness of the insulation resin wall becomes 2 mm to 3 mm, and so, the proportion of the insulation resin wall to the width size A of the connector body 11 comes to 29% to 43%. In this manner, the proportion of the insulation resin wall to the width of the connector body 11 is very high, which results in a serious cause that the optical connector is hindered in its further miniaturization.

SUMMARY OF THE INVENTION

An object of the present invention is to provide an ultra-miniaturized optical connector in which the external shape and size of an element holder for accommodating an optical element therein can be reduced up to substantially the same as those of the optical element.

Another object of the present invention is to provide an ultra-miniaturized optical connector in which the area in cross-section of the connector body can be reduced up to substantially the same as that of the optical element.

In order to accomplish the foregoing objects, in an aspect of the present invention, there is provided an optical connector which comprises: a generally square-shaped insulation body; a plug guide hole passing through the insulation body; plug holding members provided in the insulation body, and resiliently sandwiching and holding an optical plug inserted into the plug guide hole to add to the optical plug a force for preventing the optical plug from coming off; an optical element to be mounted to the rear end surface of the insulation body; an element holder to be attached to the rear end of the insulation body, that comprises a top plate, opposed side plates and a rear plate covering the top surface, the opposed side surfaces and the rear surface of the optical element respectively when the optical element is mounted in the element holder, a size between the inner surfaces of the opposed side plates being set to a value substantially equal to the maximum value in the tolerance of the corresponding external size of the optical element, the element folder being made of an electrically conductive sheet metal; a pair of engagement pieces extending forward respectively from the opposed side plates of the element holder in such manner that each engagement piece and the corresponding side plate are flush with each other, the pair of engagement pieces being engaged with engaging portions formed on the opposed side surfaces of the insulation body respectively to attach the element holder to the rear end of the insulation body; a plurality of protuberances formed on and projecting from the rear end surface of the insulation body, the plurality of protuberances engaging with the forward portion of the optical element to maintain the mounting position of the optical element at a predetermined position; and biasing force applying means provided on the rear plate of the element holder and applying to the optical element a resilient biasing force that acts, when the element holder is attached to the rear end of the insulation body, to forcedly push the front surface of the optical element mounted in the element holder against the rear end surface of the insulation body.

In a preferred embodiment, tongues for resiliently sandwiching and holding the optical element to prevent the optical element from coming off when the optical element is mounted in the element holder, are formed by cutting a portion of each side plate of the element holder and bending the cut portion inward.

The biasing force applying means is constituted by two slits formed in the rear plate of the element holder in parallel with each other in the height direction thereof at a very small interval therebetween; a strip-like portion between the slits; and a curved portion formed by pushing the strip-like portion inward to protrude inward, and two of the biasing force applying means are provided on the rear plate of the element holder at a predetermined interval. Only one biasing force applying means may be provided on the rear plate of the element holder.

The length of the rear plate of the element holder is set to a size shorter than the length of each side plate of the element holder, and the element holder is configured such that when the optical element is mounted in the element holder, terminals of the optical element are led out toward the outside through an opening portion formed under the lower end of the rear plate.

In addition, each of the opposed side plates of the element holder has a ground terminal formed integrally with the corresponding side plate at the lower end thereof and projecting outwardly from the lower end thereof. Only one of the opposed side plates of the element holder may have a ground terminal formed integrally with the side plate at the lower end thereof and projecting outwardly.

In another preferred embodiment, a slit for receiving the top portion of the top surface of the optical element when the optical element is mounted in the element holder, is formed in the top plate of the element holder in the width direction of the top plate.

In accordance with the construction of the present invention, the optical connector is arranged such that an optical element is accommodated in the element holder made by use of a sheet metal, and that the element holder is engaged with and attached to the rear end of the insulation body. Since the sheet metal has its strength higher than that of a resin, the thickness of the sheet metal constituting the element holder can be considerably decreased. As a result, it is possible to reduce the size of the external form of the element holder boundlessly down to that of the external form of the optical element.

In this manner, since the size of the external form of the element holder can be boundlessly reduced down to that of the external form of the optical element, the size in the width direction of the external form of the insulation body to which the element holder is attached can be boundlessly reduced down to that of the external form of the optical element. Accordingly, the whole external form or shape of the optical connector can be ultra-miniaturized.

BRIEF DESCRIPTION OF THE DRAWINGS

FIG. 4 is an exploded perspective view illustrating a second embodiment of the optical connector according to the present invention;

FIG. 5 is a perspective view for explaining the relation between the external shape and size of an element holder used in the optical connector shown in FIG. 1 and the external shape and size of an optical element, wherein FIG. 5A is a perspective view showing the optical element and FIG. 5B is a perspective view showing the element holder;

DETAILED DESCRIPTION OF THE PREFERRED EMBODIMENTS

The preferred embodiments of the present invention will now be described in detail with reference to FIGS. 1 to 5. The present invention may, however, be embodied in many different forms and should not be construed as limited to the embodiments set forth hereinafter; rather, the embodiments are provided so that this disclosure will be thorough and complete, and will fully convey the scope of the invention to those skilled in the art.

First, a first embodiment of the optical connector according to the present invention will be described in detail with reference to FIGS. 1 to 3.

Figure 1:
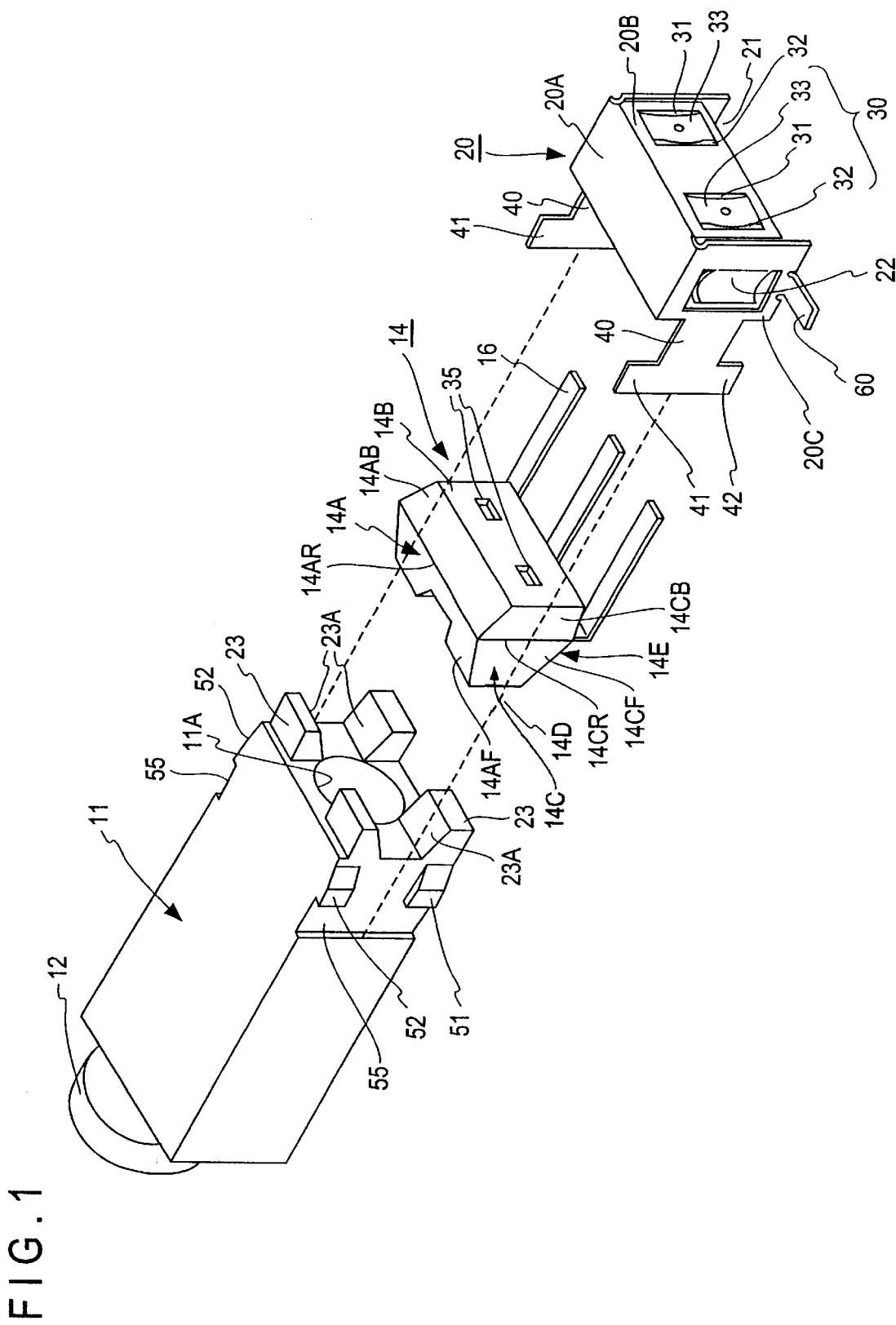
FIG. 1 is an exploded perspective view illustrating a first embodiment of the optical connector according to the present invention.
Figure 2:
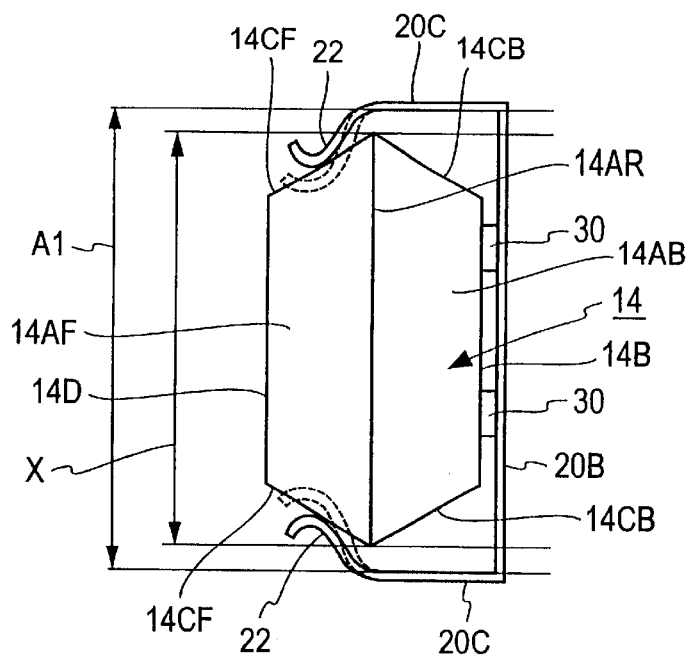
FIG. 2 is a diagrammatic plan view illustrating the state that an optical element is mounted in an element holder used in the optical connector shown in FIG. 1.
Figure 3:
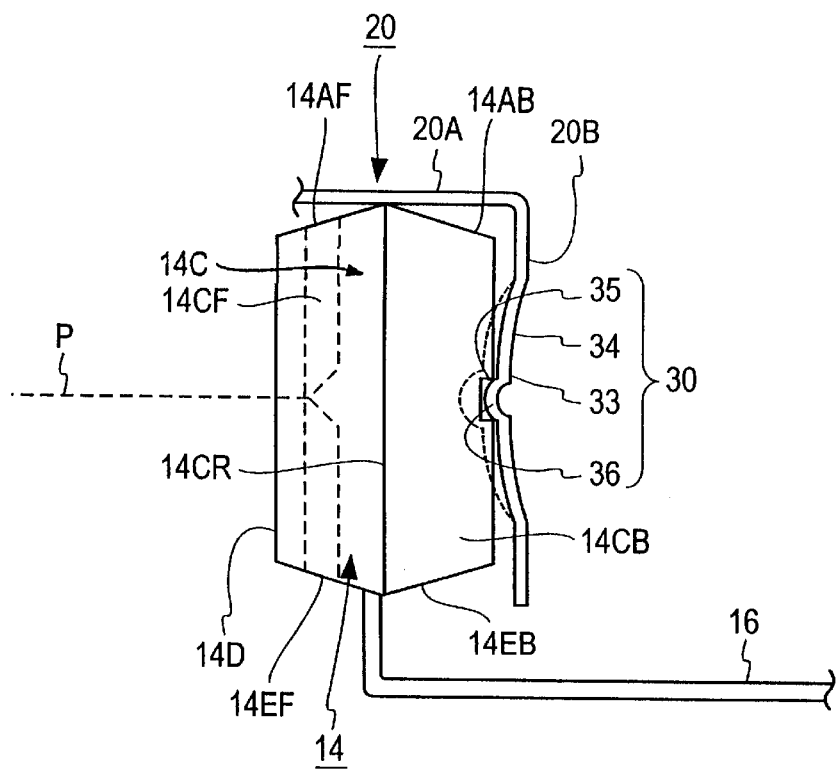
FIG. 3 is a diagrammatic plan view illustrating the state that an optical element is mounted in an element holder used in the optical connector shown in FIG. 1.
Figure 6:
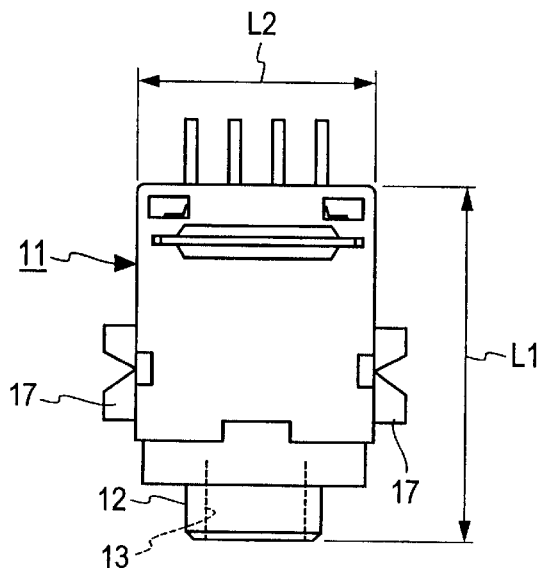
FIG. 6 is a plan view illustrating an example of the ultra-miniaturized optical connector proposed by the assignee of the present application.
Figure 7:
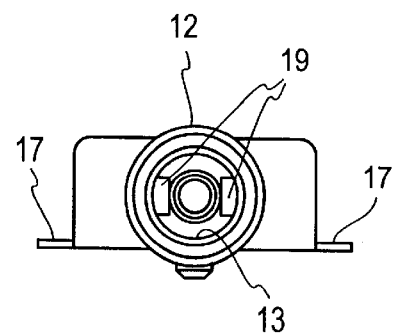
FIG. 7 is a front view of the optical connector shown in FIG. 6.
Figure 8:
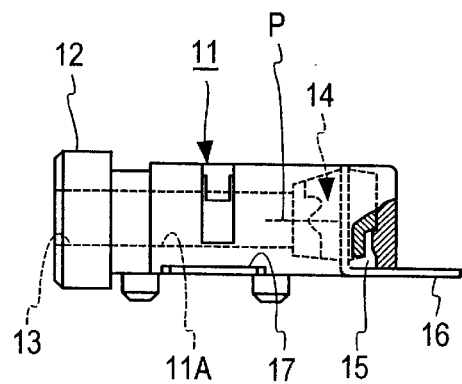
FIG. 8 is a right-hand side view of the optical connector shown in FIG. 6.
Figure 9:
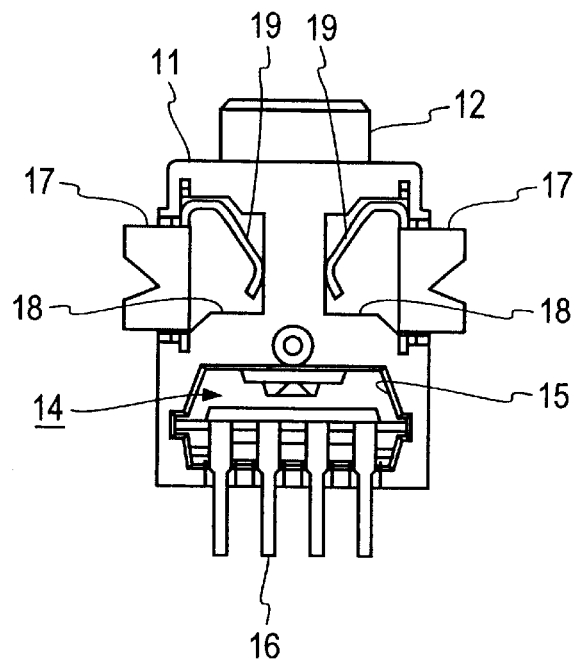
FIG. 9 is a bottom view of the optical connector shown in FIG. 6.

FIG. 1 is a an exploded perspective view showing a first embodiment of the optical connector according to the present invention, FIG. 2 is a plan view showing the state that an optical element is mounted in an element holder with the top plate of the element holder removed, and FIG. 3 is a plan view showing the state that the optical element is mounted in the element holder with the side plate removed. Further, in FIGS. 1 to 3, portions, members and elements corresponding to those shown in FIGS. 6 to 9 will be denoted by the same reference characters affixed thereto, and the explanation thereof will be omitted unless necessary.

The optical connector in this embodiment comprises a connector body 11 of generally rectangular shape in section and made of an insulation material, and a sleeve 12 formed integrally with the connector body 11 at the front end thereof and projecting forward from the connector body 11. A plug-in hole (not shown) configured such that an optical plug having its plug portion of a specified dimension in outside diameter can be plugged therein is formed through the sleeve 12 and is in communication with a plug guide hole 11A in substantially coaxial relation therebetween, the plug guide hole 11A being formed through the connector body 11 in the longitudinal direction (in the direction of the depth) thereof and extending from the front end surface of to the rear end surface of the connector body 11.

Further, though not shown, a pair of plug holding pieces are mounted in place in recesses that are formed in the connector body 11 at opposite sides of the plug guide hole 11A in such manner that they are opposed to each other. The pair of plug holding pieces serve to press and sandwich, when an optical plug is plugged in the connector body 11, a portion immediately after the maximum diameter portion of the tip portion of the optical plug between the holding pieces by the resilient forces thereof.

An optical element 14 is an element of the type that has three terminals 16 led out backward in parallel with one another from the bottom of the package of the optical element 14, in the illustrated example. The package of the optical element 14 has its front surface 14D and rear surface 14B formed in parallel with each other. The top surface 14A of the package is formed in the shape of a chevron or mountain as viewed from the side of the package as shown in FIG. 1, and consists of a forward slant surface 14AF and a backward slant surface 14AB, the forward slant surface 14AF being descended toward the front surface 14D from the ridgeline 14AR extending in the direction of the width (in the lateral direction) of the package and the backward slant surface 14AB being descended toward the rear surface 14B from the ridgeline 14AR. As can be comprehended from FIGS. 1 and 3, the bottom surface 14E of the package is formed in the same shape as that of the top surface 14A. In addition, one side surface 14C of the package is formed in the shape of a chevron or mountain projecting outward as viewed from the top of the package as shown in FIG. 2, and consists of a forward slant surface 14CF and a backward slant surface 14CB, the forward slant surface 14CF being descended toward the front surface 14D from the ridgeline 14CR (FIG. 1) extending in the direction of the vertical (in the height direction) of the package as viewed in FIG. 1 and the backward slant surface 14CB being descended toward the rear surface 14B from the ridgeline 14CR. As can be comprehended from FIG. 2, the opposite side surface of the package is formed in the same shape as that of the one side surface 14C.

An element holder 20 for accommodating and holding the optical element 14 therein is made of a resilient sheet metal by processing and working the sheet metal in this embodiment, and comprises a top plate 20A, a rear plate 20B and opposed side plates 20C that cover the top surface 14A, the rear surface 14B and the opposed side surfaces 14C of the package of the optical element 14, respectively. The top plate 20A, rear plate 20B and opposed side plates 20C are formed integrally with one another, and portions between the rear plate 20B and the opposed side plates 20C may not be formed integrally with one another.

An element accommodation section for accommodating the optical element 14 is formed by an interior space that is surrounded by the top plate 20A, rear plate 20B and opposed side plates 20C. In addition, the length of the rear plate 20B hanging down from the backward edge of the top plate 20A is shorter than the length of the opposed side plate 20C hanging down respectively from the opposed side edges of the top plate 20A so that an opening section 21 is formed under the lower end portion of the rear plate 20B. This opening section 21 serves as a lead-out port for leading the terminals 16 of the optical element 14 housed in the element accommodation section backward thereof.

Each of the opposed side plates 20C has a resilient tongue 22 formed by cutting or stamping a portion of the side plate 20C while remaining the backward end thereof as it is, and bending the portion inward. The backward end of each tongue 22 is integral with the corresponding side plate 20C, and so, the forward end portion of the tongue 22 is bent toward the inside of the element accommodation section.

When the optical element 14 is mounted in the element accommodation section, the tongues 22 serve to abut against, resiliently push and hold the forward slant surfaces 14CF of the opposed side surfaces 14C of the optical element 14, respectively, as shown in FIG. 2, thereby to position the optical element 14 substantially in the center of the element holder 20 in the width direction thereof and to align the optical axis P of the optical element 14 with the axis of the plug guide hole 11A of the connector body 11 in line.

A plurality of protuberances 23 are formed on the rear end surface of the connector body 11 on the periphery of the plug guide hole 11A. In the first embodiment shown in FIG. 1, the optical connector is configured that four protuberances 23 are formed integrally with the rear end surface of the connector body 11 at the four corners of the rear end surface one for each corner, and the forward slant surface 14AF of the top surface 14A and the forward slant surface 14EF of the bottom surface 14E of the package of the optical element 14 are engaged with the protuberances 23 to locate the position of the optical element 14 in place and to hold the mounted optical element 14 in place.

For this reason, the surfaces 23A of the protuberances 23 abutting on the forward slant surface 14AF of the top surface 14A and the forward slant surface 14EF of the bottom surface 14E of the package are formed to have substantially the same slant as that of the forward slant surfaces 14AF and 14EF, and an interval between the slant surfaces 23A of each pair of the protuberances 23 opposed to each other in the vertical direction is set to a dimension so that the forward end portion of the package of the optical element 14 is tightly fitted in between the slant surfaces 23A of each pair of the protuberances 23.

In order to push or press the optical element 14 against the rear end surface of the connector body 11, a biasing force applying means 30 is provided in the rear plate 20B of the element holder 20. In the first embodiment shown in FIG. 1, the biasing force applying means 30 is constructed such that two slits 31 and 32 are formed in the rear plate 20B in parallel with each other in the height or vertical direction thereof at a very small interval therebetween to form a strip-like portion 33 between the slits 31 and 32, and the strip-like portion 33 is pushed in the interior of the element accommodation section to form a curved portion 34 as shown in FIG. 3. The biasing force applying means 30 is formed on the rear plate 20B at proper two positions thereof thereby to apply to the optical element 14 mounted in the element accommodation section a biasing force that presses uniformly the optical element 14 forward. Further, in the first embodiment, the optical connector is constructed such that two cavities 35 are formed on the rear surface 14B of the package of the optical element 14 at a predetermined interval, and protuberances 36 each of which is formed at substantially the center of each strip-like portion 33 are engaged with the corresponding cavities 35, thereby to precisely locate the contact portions between the strip-like portions 33 and the optical element 14.

Accordingly, when the optical element 14 is mounted in the element accommodation section of the element holder 20, and thereafter the element holder 20 is pushed in toward the rear end surface of the connector body 11 while the forward slant surface 14AF of the top surface 14A and the forward slant surface 14EF of the bottom surface 14E of the package of the optical element 14 are engaged with the slant surfaces 23A of the protuberances 23 on the rear end surface of the connector body 11, the front surface of the optical element 14 abuts forcedly against the rear end surface of the connector body 11 so that the front surface of the optical element 14 and the rear end surface of the connector body 11 are held in parallel with each other and hence the optical element 14 is located precisely at a predetermined position. Consequently, the optical axis P of the optical element 14 is aligned with the axis of the plug guide hole 11A formed through the connector body 11 in line, and it is possible to always maintain the optical coupling condition between an optical plug inserted into the connector body 11 and the optical element 14 at constant.

Each of the opposed side plates 20C of the element holder 20 has an engagement piece 40 formed integrally with the corresponding side plate 20C in a manner that they are flush with each other and projecting forward from the corresponding side plate 20C. In the first embodiment, the engagement pieces 40 projecting from the side plates 20C are formed in the shape of a letter T. The width (vertical length as viewed in FIG. 1) of the forward end portion of each engagement piece 40 is substantially equal to the width (vertical length as viewed in FIG. 1) of the side surface of the connector body 11.

On the other hand, a recess 55 is formed on each side surface of the connector body 11 near the rear end and the depth of the recess 55 corresponds to the thickness of the engagement pieces 40 of the side plate 20C. In case of forming the recess 55, two portions of each side surface near the top surface and the bottom surface of the connector body 11 are left as they are (that is, not removed) thereby to form two protrusions 51 and 52. These protrusions 51 and 52 have their backward end portions (end portions near the rear end surface of the connector body 11) formed in slant surfaces so that, when the element holder 20 is attached to the connector body 11, the engagement pieces 40 projecting respectively from the side plates 20C can be easily slid on the protrusions 51 and 52.

When the optical element 14 is mounted in the element accommodation section of the element holder 20 constructed as described above, as shown in FIGS. 2 and 3, the tongues 22 formed respectively in the opposed side plates 20C abut against, resiliently push and hold the forward slant surfaces 14CF of the opposed side surfaces 14C of the optical element 14, respectively, as well as the two strip-like portions 33 apply a biasing force that pushes uniformly the optical element 14 forward. As a result, the optical element 14 is precisely located at a predetermined position in the element holder 20 in substantially the center thereof in the width direction thereof. Then, the element holder 20 is pushed in toward the rear end surface of the connector body 11 while the forward slant surface 14AF of the top surface 14A and the forward slant surface 14EF of the bottom surface 14E of the package of the optical element 14 are engaged with the slant surfaces 23A of the protuberances 23 on the rear end surface of the connector body 11 as well as the pair of engagement pieces 40 of T-shape that project respectively from the side plates 20C of the element holder 20 are engaged with the corresponding recesses 55 on the side surfaces of the connector body 11. As a result, the instant that the forward end portions of the pair of engagement pieces 40 slide on the protrusions 51 and 52 in the corresponding recesses 55 and climb over them, the engagement pieces 40 stop further advancing because the forward ends of the engagement pieces 40 abut against the forward walls of the recesses 55 (steps on the side surfaces of the connector body 11), and at the same time, the engaged portions 41 and 42 of the forward end portion of each of the pair of engagement pieces 40 are fitted and anchored between the forward wall of the recess 55 and the forward end walls (end walls toward the sleeve 12) of the protrusions 51 and 52. Accordingly, the element holder 20 is integrally mounted to the connector body 11. In consequence of such engagement, the front surface of the optical element 14 is forcedly pushed against the rear end surface of the connector body 11, and they are held in parallel with each other so that the optical axis P of the optical element 14 can be aligned with the axis of the plug guide hole 11A formed through the connector body 11 in line.

Further, on the lower end of each side plate 20C of the element holder 20 is formed integrally therewith a ground terminal 60 projecting outward at substantially right angles, and the optical connector may be fixed on a printed board (not shown) by, for example, soldering the pair of ground terminals 60 on a common potential conductor on the printed board.

As is apparent from the foregoing, in the first embodiment, the element holder 20 is made by use of a resilient sheet metal and the optical element 14 is housed in the element accommodation section of the element holder 20. Since the sheet metal has its strength higher than that of a resin, if the thickness of the sheet metal is set to 0.2 mm to 0.3 mm or so, a sufficient strength higher than that of a resin can be obtained. Thus, it is possible to reduce the size of the external form of the element holder 20 except the engagement pieces 40 boundlessly down to that of the external form of the optical element 14 except the terminals 16.

Assuming that the dimension in the width direction of the optical element 14 is X, the dimension in the height direction thereof is Y, and the dimension in the depth direction thereof is Z as shown in FIG. 5A, and that the dimension in the width direction of the element holder 20 is A, the dimension in the height direction thereof is B, and the dimension in the depth direction thereof is C as shown in FIG. 5B, then the minimum values of the external dimensions (A, B, C) of the element holder 20 can be defined by that dimensions of a space surrounded by the inner surfaces of the top plate 20A, the rear plate 20B and the opposed side plates 20C constituting the element holder 20 are values that are boundlessly close to the maximum values of allowances or tolerances in manufacture of the optical element 14 for the dimensions (X, Y, Z) thereof.

Figure 10:
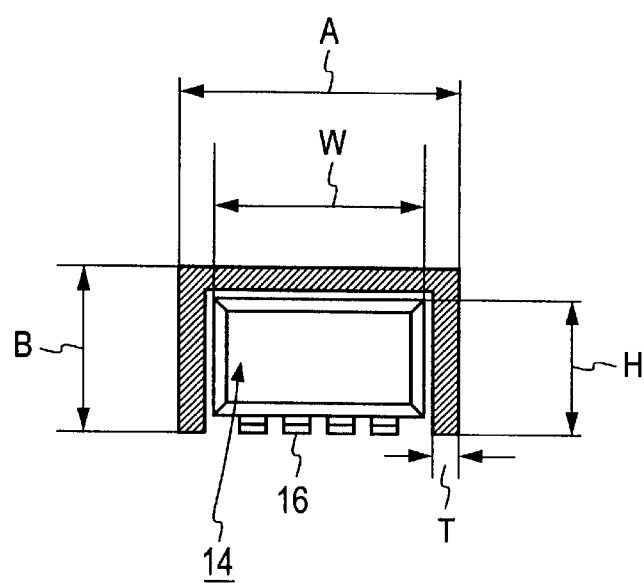
FIG. 10 is a diagrammatic sectional view for explaining the relation between the external shape and size of the optical connector shown in FIG. 6 and the external shape and size of an optical element.

In FIG. 5A, if the tolerance in manufacture of, for example, the dimension (length of the ridgeline 14AR) X in the width direction of the optical element 14 is X±0.2 mm, then the dimension A1 (see FIG. 2) between the inner surfaces of the opposed side plates 20C of the element holder 20 can be set to X+0.2 mm (A1=X+0.2 mm). In this case, if the thickness of each side plate 20C is 0.2 to 0.3 mm, the dimension A in the width direction of the element holder 20 becomes X+0.2+2×(0.2 to 0.3) mm. Assuming that the width dimension X of the optical element 14 is 5 mm and the thickness of each side plate 20C is 0.3 mm that is the maximum value thereof, the width dimension A of the element holder 20 becomes 5+0.2+2×0.3=5.8 mm. As a result, the proportion of the thickness of the opposed side plates 20C to the width dimension A of the element holder 20 becomes 0.6/5.8% that is about 10.34% even in the case the thickness of each side plate 20C has the maximum value. On the contrary, in FIG. 10, if the width dimension W of the optical element 14 is 5 mm equal to the dimension X in FIG. 5A and the thickness T of each insulation resin wall is 1.5 mm that is the maximum value thereof, the width dimension A of the connector body 11 becomes 5+0.2+2×1.5=8.2 mm. As a result, the proportion of the thickness of the opposed insulation resin walls to the width dimension A of the connector body 11 becomes 3/8.2% (about 36.58%). Thus, it is to be comprehended that in the optical connector of the first embodiment described above, the width dimension A of the element holder 20 can be considerably reduced.

In such manner, if the size of the space surrounded by the inner surfaces of the top plate 20A, the rear plate 20B and the opposed side plates 20C of the element holder 20 is set to a value that is boundlessly close to the maximum value of allowance or tolerance in the size of the optical element 14, not only the width dimensions A of the element holder 20 and the connector body 11 can be considerably reduced but the external shape or form of the element holder 20 can be minimized because the optical element 14 can be correctly accommodated in the element holder 20 and yet there occurs no unavailing space.

Since the width dimension A of the element holder 20 can be set to the sum of the maximum value of allowance in the size of the optical element 14 and the thickness of the opposed side plates 20C, a distance between the inner surfaces of the pair of engagement pieces 40 is also set to the maximum value of the width dimension X of the optical element 14, and hence it is possible that the size of the external form of the connector body 11 with which the engagement pieces 40 are engaged is set to the value equal to the size of the external form of the element holder 20. As a result, the size of the whole external form of the assembly including the connector body 11 and the element holder 20 can be set to a size as minimum as possible on the basis of the size of the optical element 14.

Thus, even there are proposed optical plugs each having its plug portion of 2 mm or smaller than 2 mm in outside diameter with the miniaturization of various kinds of electronic apparatuses and appliances, ultra-miniaturized optical connectors (receptacles or jacks) corresponding to those optical plugs can be provided.

Moreover, in the first embodiment, the optical connector is constructed such that when the element holder 20 is engaged with the connector body 11 and attached thereto, the optical element 20 is elastically pressed against the rear end surface of the connector body 11 by the biasing force applying means 30 provided on the rear plate 20B of the element holder 20. Therefore, the element holder 20 holds firmly the optical element 14 in the predetermined position therein without any shake. Thus, there can be provided the optical connector in which the optical coupling between an optical plug plugged in the connector body 11 and the optical element 14 is always maintained in stable condition.

Furthermore, there is added the structure that when the optical element 14 is mounted in the element holder 20, the inwardly curved tongues 22 formed respectively in the opposed side plates 20C of the element holder 20 abut against, forcedly push and hold the forward slant surfaces 14CF of the opposed side surfaces 14C of the optical element 14, respectively, thereby to nip the optical element 14 between the tongues 22. Accordingly, even if there is a difference in dimension between the width dimension X of the optical element 14 and the dimension A1 between the inner surfaces of the opposed side plates 20C of the element holder 20, the optical element 14 is held at the central portion of the element holder 20 in stable state. As a result, it is unnecessary to perform a work or operation for adjusting the position of the optical element 14 when the optical element 14 is mounted in the element holder 20, and/or a work or operation for aligning the axis of the plug guide hole 11A of the connector body 11 with the optical axis P of the optical element 14 in line in case the element holder 20 having the optical element 14 already mounted therein is attached to the connector body 11. In other words, it is possible to align the optical axis P of the optical element 14 with the axis of an optical plug plugged in the connector body 11 in line without adjusting or regulating the position of the optical element 14 when it is mounted in the element holder 20. Accordingly, there is obtained an advantage that an assembling work or operation for the optical connector becomes very easy, which results in an improvement of work or operation efficiency.

In addition, since the optical connector is constructed such that the optical element 14 is covered with the element holder 20 made by working and processing a sheet metal, and that the element holder 20 is electrically connected to a common electric potential point by way of the ground terminals 60, in case the optical element 14 is a light receiving element, there is obtained an advantage that an electric potential surrounding the periphery of the light receiving element is stabilized so that light can be efficiently converted into an electric signal without any jitter generated. In case the optical element 14 is a light emitting element, there is also obtained an advantage that the amount of driving signals for the light emitting element leaking out to the outside can be decreased.

FIG. 4 is an exploded perspective view illustrating a second embodiment of the optical connector according to the present invention. Further, in FIG. 4, portions, members and elements corresponding to those shown in FIGS. 1 to 3 will be denoted by the same reference characters affixed thereto, and the explanation thereof will be omitted unless necessary.

In this second embodiment, a connector body 11 of generally rectangular shape in section and made of an insulation material may be a body that has the same external form or shape, size or dimension and structure as those of the connector body 11 shown in the first embodiment described above except that one protrusion 53 is formed in a recess 55 formed on each of the opposed side surfaces of the connector body 11 near the rear end portion thereof, and hence in FIG. 4, only a portion of the connector body 11 in the vicinity of the rear end portion thereof is shown. Like the first embodiment, each protrusion 53 has its backward end portion (end portion near the rear end surface of the connector body 11) formed in a slant surface so that, when an element holder 20 is attached to the connector body 11, a pair of engagement pieces 40 projecting respectively from opposed side plates 20C can be easily slid on the protrusions 53.

In a top plate 20A of the element holder 20 is formed a slit S that is elongate in the width direction of the top plate 20A, and the pair of engagement pieces 40 is constituted by generally rectangular extensions of the opposed side plates 20C extending forward from the opposed side plates 20C respectively. A square-shaped opening 43 is formed in each engagement piece 40. Further, other construction, structure, size or dimension, and the like of the element holder 20 are the same as those of the element holder 20 shown in the first embodiment described above, and the explanation thereof will be omitted. In addition, since an optical element mounted in the element holder 20 has the same external shape or form, size or dimension and structure as those of the optical element 14 shown in the first embodiment, it is not shown in FIG. 4.

The slit S to be formed in the top plate 20A of the element holder 20 is formed at a place of the top plate 20A corresponding to the ridgeline 14AR of the top surface 14A of the package of the optical element 14 (see FIG. 1). In case of manufacturing the package of the optical element 14, there may be formed protrusions on the ridgeline. If the protrusions are formed on the ridgeline, there is a possibility that in case the optical element is mounted in the element accommodation section of the element holder 20, the protrusions abut against the inner surface of the top plate 20A so that the optical element cannot be housed in the element accommodation section of the element holder 20. For this reason, in the second embodiment, the slit S is formed at a place of the top plate 20A opposed to the ridgeline of the top surface 14A of the package of the optical element, thereby to receive the protrusions in the slit S if the package should have the protrusions on the ridgeline. That is, the optical connector of the second embodiment is constructed such that the optical element can be stored in the element accommodation section of the element holder 20 in stable state whether the package has the protrusions on the ridgeline or not.

When the optical element 14 is mounted in the element accommodation section of the element holder 20 constructed as described above, like the case of the first embodiment, the tongues 22 formed respectively in the opposed side plates 20C abut against, resiliently push and hold the forward slant surfaces 14CF of the opposed side surfaces 14C of the optical element 14, respectively, as well as the two strip-like portions 33 apply a biasing force that pushes uniformly the optical element 14 forward. As a result, the optical element 14 is precisely located at a predetermined position in the element holder 20 in substantially the center thereof in the width direction thereof. Then, the element holder 20 is pushed in toward the rear end surface of the connector body 11 while the forward slant surface of the top surface and the forward slant surface of the bottom surface of the optical element package are engaged with the slant surfaces 23A of the protuberances 23 on the rear end surface of the connector body 11 as well as the pair of engagement pieces 40 that project respectively from the opposed side plates 20C of the element holder 20 are engaged with the corresponding recesses 55 on the side surfaces of the connector body 11. As a result, the instant that the pair of engagement pieces 40 slide on the protrusions 53 in the corresponding recesses 55 and climb over them, the engagement pieces 40 stop further advancing because the forward ends of the engagement pieces 40 abut against the forward walls of the recesses 55 (steps on the side surfaces of the connector body 11), and at the same time, the openings 43 of the engagement pieces 40 are fitted in the protrusions 53, respectively. Accordingly, the forward end portion of each of the openings 43 of the pair of engagement pieces 40 is fitted and anchored between the forward wall of the recess 55 and the forward end wall of the protrusion 53, and the element holder 20 is integrally attached to the connector body 11. In consequence of such engagement, the front surface of the optical element is forcedly pushed against the rear end surface of the connector body 11, and they are held in parallel with each other so that the optical axis P of the optical element can be aligned with the axis of the plug guide hole 11A formed through the connector body 11 in line.

In the second embodiment constructed as described above as well, the element holder 20 is also made by use of a resilient sheet metal and has its construction and structure similar to those of the element holder 20 of the first embodiment, and the optical element is housed in the element accommodation section of the element holder 20. Therefore, it is needless to say that in the optical connector of the second embodiment, there are obtained the same functions and effects as those obtained from the optical connector of the first embodiment described above. In addition thereto, in the second embodiment, since the slit S is formed in the top plate 20A of the element holder 20, the protrusions formed on the optical element can be received in this slit S, and hence there is obtained a further advantage that an accident that an optical element having protrusions thereon cannot be housed in the element holder 20 can be prevented from occurring. Moreover, it is unnecessary to design the element holder 20 in such manner that it has a larger external shape in which the sizes in the height direction of the opposed side plates 20C and the rear plate 20B are lengthened by taking the protrusions of the optical element into consideration. Therefore, there is also obtained an advantage that the external shape of the element holder 20 can be miniaturized.

In the first and the second embodiments, though the biasing force applying means 30 is provided at two places on the rear plate 20B of the element holder 20, the biasing force applying means 30 may be provided at only one place on the rear plate 20B corresponding to the central portion thereof, or alternatively, the biasing force applying means 30 may be provided at three or more places on the rear plate 20B at predetermined intervals. It is to be noted that the shape, the number, etc., of the tongues 22 formed in the opposed side plates 20C may be modified, altered or changed at will, if the need arises. In addition, the shape and the structure of the pair of engagement pieces 40 may be modified, altered or changed depending upon the shape and the structure of the engagement portions on the opposed side surfaces of the connector body 11. It goes without saying that the number, shape and structure of the engaging protuberances 23 on the rear end surface of the connector body 11 as well as the shape, construction and structure of the element holder 20 may be modified, altered or changed depending upon the shape and the structure of the package of the optical element 14.

As described above, according to the present invention, many and remarkable advantages are obtained. For example, since it is possible to reduce the size of the external form of the element holder boundlessly down to that of the external form of the optical element, and particularly, to greatly reduce the dimension in the width direction of the element holder, the size of the whole external form of the assembly including the connector body and the element holder can be set to a size as minimum as possible on the basis of the size of the optical element. Accordingly, even there are proposed optical plugs each having its plug portion of 2 mm or smaller than 2 mm in outside diameter with the miniaturization of various kinds of electronic apparatuses and appliances, ultra-miniaturized optical connectors (receptacles or jacks) corresponding to those optical plugs can be provided.

In addition, when the optical element is mounted in the element holder, the element holder can hold firmly the optical element in place therein without any shake. Accordingly, it is possible to align the optical axis P of the optical element with the axis of an optical plug plugged in the connector body in line without adjusting or regulating the position of the optical element, and there is obtained an advantage that an assembling work or operation for the optical connector becomes very easy, which results in an improvement of work or operation efficiency. In addition, there can be provided the optical connector in which the optical coupling condition between an optical plug plugged in the connector body and the optical element is always maintained in stable state.

Moreover, since the element holder can be electrically connected to a common electric potential point by way of the ground terminals of the element holder, in case the optical element is a light receiving element, there is obtained an advantage that an electric potential surrounding the periphery of the light receiving element is stabilized so that light can be efficiently converted into an electric signal without any jitter generated. In case the optical element is a light emitting element, there is also obtained an advantage that the amount of driving signals for the light emitting element leaking out to the outside can be decreased.

While the present invention has been described with regard to the preferred embodiments shown by way of example, it will be apparent to those skilled in the art that various modifications, alterations, changes, and/or minor improvements of the embodiments described above can be made without departing from the spirit and the scope of the present invention. Accordingly, it should be understood that the present invention is not limited to the illustrated embodiments, and is intended to encompass all such modifications, alterations, changes, and/or minor improvements falling within the scope of the invention defined by the appended claims.

What is claimed is:

1. An optical connector comprising:
    a generally square-shaped insulation body;
    a plug guide hole passing through said insulation body;
    plug holding members provided in the insulation body, and resiliently sandwiching and holding an optical plug inserted into said plug guide hole to add to said optical plug a force for preventing the optical plug from coming off;
    an optical element to be mounted to the rear end surface of the insulation body;
    an element holder to be attached to the rear end of the insulation body, that comprises a top plate, opposed side plates and a rear plate covering the top surface, the opposed side surfaces and the rear surface of said optical element respectively when the optical element is mounted in the element holder, a size between the inner surfaces of the opposed side plates being set to a value substantially equal to the maximum value in the tolerance of the corresponding external size of the optical element, said element holder being made of an electrically conductive sheet metal;
    a pair of engagement pieces extending forward respectively from the opposed side plates of the element holder in such manner that each engagement piece and the corresponding side plate are flush with each other, said pair of engagement pieces being engaged with engaging portions formed on the opposed side surfaces of the insulation body respectively to attach the element holder to the rear end of the insulation body;
    a plurality of protuberances formed on and projecting from the rear end surface of the insulation body, said plurality of protuberances engaging with the forward portion of the optical element to maintain the mounting position of the optical element at a predetermined position; and
    biasing force applying means provided on the rear plate of the element holder and applying to the optical element a resilient biasing force that acts, when the element holder is attached to the rear end of the insulation body, to forcedly push the front surface of the optical element mounted in the element holder against the rear end surface of the insulation body.

2. The optical connector as set forth in claim 1, wherein tongues for resiliently sandwiching and holding the optical element to prevent the optical element from coming off when the optical element is mounted in the element holder, are formed by cutting a portion of each side plate of the element holder and bending the cut portion inward.

3. The optical connector as set forth in claim 2, wherein a slit for receiving the top portion of the top surface of the optical element when the optical element is mounted in the element holder, is formed in the top plate of the element holder in the width direction of the top plate.

4. The optical connector as set forth in claim 3, wherein a plurality of the biasing force applying means are provided on the rear plate of the element holder at a predetermined interval.

5. The optical connector as set forth in claim 4, wherein each of the biasing force applying means is constituted by two slits formed in the rear plate of the element holder in parallel with each other in the height direction thereof at a very small interval therebetween;
    a strip-like portion between the slits;
    a curved portion formed by pushing the strip-like portion inward to protrude inward.

6. The optical connector as set forth in claim 3, wherein at least one of the opposed side plates of the element holder has a ground terminal formed integrally with the side plate at the lower end thereof and projecting outwardly from the lower end thereof.

7. The optical connector as set forth in claim 2, wherein a plurality of the biasing force applying means are provided on the rear plate of the element holder at a predetermined interval.

8. The optical connector as set forth in claim 7, wherein each of the biasing force applying means is constituted by two slits formed in the rear plate of the element holder in parallel with each other in the height direction thereof at a very small interval therebetween;
    a strip-like portion between the slits; and
    a curved portion formed by pushing the strip-like portion inward to protrude inward.

9. The optical connector as set forth in claim 2, wherein the biasing force applying means is constituted by two slits formed in the rear plate of the element holder in parallel with each other in the height direction thereof at a very small interval therebetween;
    a strip-like portion between the slits; and
    a curved portion formed by pushing the strip-like portion inward to protrude inward.

10. The optical connector as set forth in claim 2, wherein at least one of the opposed side plates of the element holder has a ground terminal formed integrally with the side plate at the lower end thereof and projecting outwardly from the lower end thereof.

11. The optical connector as set forth in claim 1, wherein a slit for receiving the top portion of the top surface of the optical element when the optical element is mounted in the element holder, is formed in the top plate of the element holder in the width direction of the top plate.

12. The optical connector as set forth in claim 11, wherein a plurality of the biasing force applying means are provided on the rear plate of the element holder at a predetermined interval.

13. The optical connector as set forth in claim 12, wherein each of the biasing force applying means is constituted by two slits formed in the rear plate of the element holder in parallel with each other in the height direction thereof at a very small interval therebetween;

a strip-like portion between the slits; and a curved portion formed by pushing the strip-like portion inward to protrude inward.

14. The optical connector as set forth in claim 11, wherein at least one of the opposed side plates of the element holder has a ground terminal formed integrally with the side plate at the lower end thereof and projecting outwardly from the lower end thereof.

15. The optical connector as set forth in claim 1, wherein a plurality of the biasing force applying means are provided on the rear plate of the element holder at a predetermined interval.

16. The optical connector as set forth in claim 15, wherein each of the biasing force applying means is constituted by two slits formed in the rear plate of the element holder in parallel with each other in the height direction thereof at a very small interval therebetween;

a strip-like portion between the slits; and a curved portion formed by pushing the strip-like portion inward to protrude inward.

17. The optical connector as set forth in claim 1, wherein the biasing force applying means is constituted by two slits formed in the rear plate of the element holder in parallel with each other in the height direction thereof at a very small interval therebetween;

a strip-like portion between the slits; and a curved portion formed by pushing the strip-like portion inward to protrude inward.

18. The optical connector as set forth in claim 1, wherein at least one of the opposed side plates of the element holder has a ground terminal formed integrally with the side plate at the lower end thereof and projecting outwardly from the lower end thereof.

19. The optical connector as set forth in claim 1, wherein the length of the rear plate of the element holder is set to a size shorter than the length of each side plate of the element holder, and the element holder is configured such that when the optical element is mounted in the element holder, terminals of the optical element are led out toward the outside through an opening portion formed under the lower end of the rear plate.

* * * * *